Oct. 5, 1954  A. P. BARCUS  2,690,895

VALVE

Filed April 21, 1948

Inventor
Anthony P. Barcus

Tom Walker
Attorney

Patented Oct. 5, 1954

2,690,895

UNITED STATES PATENT OFFICE 2,690,895

VALVE

Anthony P. Barcus, Dayton, Ohio, assignor to Bar-Jon Manufacturing Company, Dayton, Ohio, a partnership Application April 21, 1948, Serial No. 22,310

3 Claims. (Cl. 251—297)

This invention relates to fluid control valves, and more particularly to a device of this class designed to be moved alternatively to open and closed positions and to be yieldingly held in each such position.

Fluid control valves embodying the present invention are generally applicable for use as drain valves in fluid conduits, tanks or the like. With slight modification of the housing or body member, the valve may be adapted for use as a conventional cut-off valve in fluid pressure lines.

Competitive valves intended for comparable uses have numerous undesirable features, including a complicated actuating mechanism, additional discharge openings, all of which contribute in making such valves not only expensive in initial cost, but expensive to maintain as well as difficult to operate.

The object of the present invention is to simplify the construction as well as the means and mode of operation of fluid control valves as disclosed herein, whereby such valves may not only be economically manufactured, but will be more efficient in use, adaptable to a wide variety of installations, having relatively few parts, and be unlikely to get out of repair.

A further object of the invention is to obtain a drain or cut-off type valve characterized by a simple yet rugged construction and by a quick acting movement to open and closed positions.

Another object of the invention is to obtain a valve of the kind described which may be opened and closed by a simple axial movement of a projecting valve stem.

A further object of the invention is to provide a detent mechanism for the valve assisting in urging the valve to its selected position of adjustment and resisting accidental operation thereof.

A further object of the invention is to provide a valve of simplified construction in which the valve stem serves as the discharge opening for the valve.

A further object of the invention is to provide a valve possessing the advantageous structural features, the inherent meritorious characteristics and the mode of operation herein set forth.

With the above primary and other incidental objects in view as will more fully appear in the specification, the invention intended to be protected by Letters Patent consists of the features of construction, the parts and combinations thereof, and the mode of operation, as hereinafter described or illustrated in the accompanying drawings, or their equivalents.

Referring to the accompanying drawings, wherein is found the preferred but obviously not necessarily the only form of embodiment of the invention, Fig. 1 is a perspective view of a drain valve embodying the present invention;

Like parts are indicated by similar characters of reference throughout the several views.

Figure 1:
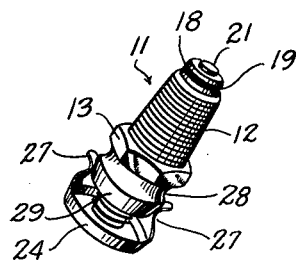

Referring to Fig. 1, a drain valve comprises, according to the present invention, a cylindrical body 11. At its one end and for a distance inwardly thereof the body 11 is externally threaded at 12 to facilitate its mounting in a tank, pipe line or other container or conduit from which it may be desired to withdraw fluid. At about its mid-point the body 11 is formed with a flange 13 angularly cut to accommodate a wrench for tightening and loosening the body in its installation.

The body 11 is further formed with a longitudinal bore 14 (see Fig. 2) extending throughout the length of the body. At the end of the bore surrounded by threaded surface 12, which may be termed the inner end of the bore, a beveled surface defines a valve seat 15.

Cooperating with the valve seat 15 is a valve mechanism comprising a tubular valve stem member 16 mounted for axial movement within bore 14. The opposite ends of the tubular member 16 project outside the respective ends of the bore 14. One end of the tubular member 16 is closed, while the other end thereof is open. The closed end of member 16 is peripherally rabbeted to define a ledge 17 upon which an annular sealing gasket 18 is seated. The seal 18 is retained in position upon the ledge 17 by a washer 19 surrounding a projecting crown 21 on the closed end of valve stem 16. The upper edge of crown 21 is spun or otherwise turned upon the washer 19 to make of the valve stem 16, seal 18 and washer 19 a unitary assembly.

The outer diameter of the sealing gasket 18 is slightly greater than the diameter of tubular member 16. Accordingly, the seal 18 engages seat 15 on the body 11 with a valve action.

Figure 2:
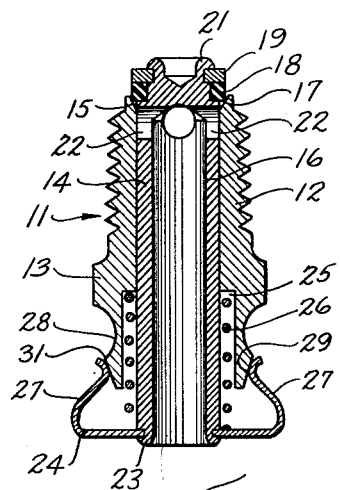
Fig. 2 is an enlarged view in longitudinal section through the valve of Fig. 1, showing the valve in closed position.

Formed in the valve stem 16, immediately adjacent the closed end thereof and seal 18, is a set of radial ports 22. When valve 18 rests upon seat 15, the ports 22 occupy a position beneath or outwardly of valve seat 15 and accordingly are cut off from communication with the exterior of the body 11 except through the open end of tubular member 16. Upon inward axial motion of tubular member 16 thereby lifting valve 18 from its seat, the radial ports 22 occupy a position inwardly of seat 15 and so connect the interior of the tank, conduit or other place of installation of the valve body with a place of drain through the hollow valve stem 16. The position of the parts when the valve is closed is shown in Fig. 2, and, when open, in Fig. 3.

The outer end of tubular member 16 is accessible for a manual pushing and pulling thereof to effect reciprocating axial motion and consequent seating and unseating of the valve gasket 18. On the outer end of the member 16 is formed a projecting flange 23, spun or otherwise, bent over upon a circular pressure plate 24 surrounding flange 23. The plate 24 is thereby made a part of the assembly comprising tubular member 16 and the valve 18.

In the outer end of the body 11 is a counterbore 25. Arranged within the counterbore 25 is a compression spring 26 pressing outwardly upon the plate 24. This action, as transmitted through the tubular member 16, is such as to normally urge valve 18 to a closed position upon seat 15. By virtue of the spring 26, the valve 18 normally is yieldingly held closed against the effects of vibration, changes in altitude, position and the like.

The plate 24 is provided with a pair of diametrically opposed spring fingers 27 which extend into sliding, yielding contact with the external surface of the outer end of body 11. This surface of the body is formed with opposed circumferential slopes 28 and 29 separated by a ridge 31. The engaging portions of spring fingers 27 are curved to present a rounded area for contact with the slopes 28 and 29. It will be observed that the arrangement is such that when the parts occupy the position shown in Fig. 2, with valve 18 closed or seated upon valve seat 15, the spring 26 is extended and the spring fingers 27 are in engagement with the outermost sloping surface 29. The surface 29 acts as a cam, resisting inward motion of the spring fingers, and the fingers pressing against the surface 29 act in a manner to aid the expansion of spring 26 to retain the valve in closed position.

Figure 3:
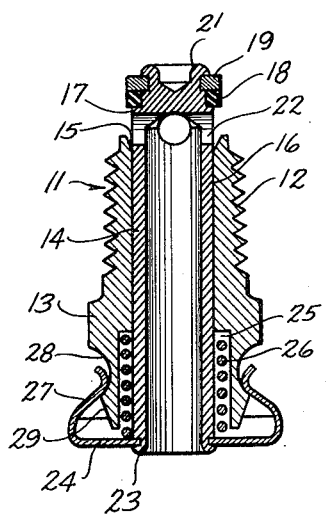
Fig. 3 is a view similar to Fig. 2, showing the valve in open position.

If, however, sufficient axial force is applied to tubular member 16 to overcome the detent presented by surface 29 in cooperation with fingers 27, then the valve stem 16 will move axially inward, carrying the spring fingers 27 upward along the sloping surface 29. As the fingers 27 ride over the ridge 31, they engage the downwardly sloping surface 28 so that a reverse detent takes effect. That is, the cam surface presented by the slope 28 is opposed to outward axial movement of the tubular member 16 and so acts through the spring fingers 27 to retain the valve 18 in open position, as seen in Fig. 3. It will be noted that in this instance, as in the case of slope 29, the effect of the spring action of the fingers 27 upon slope 28 is to urge the tubular member 16 in a direction to unseat valve 18. Further, it will be noted that the slope 28 is steeper than the slope 29, this being so since a greater retaining force is required to hold valve 18 open against the opposition of spring 26. When it is desired to close the valve, the valve stem 16 is manually pulled outwardly thereby overcoming the resistance of slope 28 and spring fingers 27, whereupon the parts are restored to the position of Fig. 2.

Figure 4:
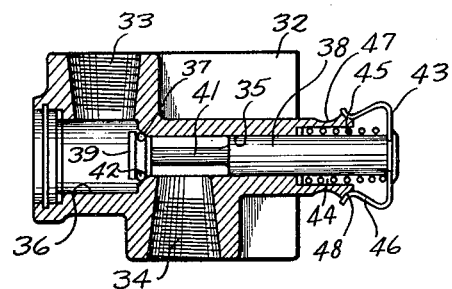
Fig. 4 is a view in longitudinal section of a modified valve embodying the present invention and usable as a cut-off valve.

In Fig. 4, a modified form of the invention is shown wherein a valve of the present class is used to control fluid flow between inlet and outlet ports of a valve body. As shown therein, a body 32 presents an inlet port 33 and an outlet port 34. The ports 33 and 34 are slightly offset with respect to one another and open into a longitudinal bore 35 extending through the body 32. At one end of the body is formed a counterbore 36 receiving a suitable closure at its open end. The bottom of counterbore 36 surrounding bore 35 is beveled to provide a valve seat 37. The inlet 33 and outlet 34 communicate with one another through the opening into counterbore 36 surrounded by the valve seat 37. Reciprocable within the longitudinal bore 35 is a piston stem 38 connected to a valve head 39 by a reduced diameter neck portion 41. Valve head 39 lies within counterbore 36 and is peripherally grooved to receive a ring seal 42. Ring seal 42 is engageable with valve seat 37 to cut off communication between inlet 33 and outlet 34.

Piston stem 38 extends outside the bore 35 and has mounted thereon a clip 43 similar to clip 24 of the drain valve shown in Figs. 1 to 3. A counterbore 44 surrounds the outer end of piston stem 38 and receives a compression spring 45 pressing against the spring clip 43. The action of the spring 45 is to urge piston stem 38 outwardly or in a direction to seat seal 42 upon valve seat 37. Upon axial motion of piston stem 38 inward, valve 42 is moved to open position relative to valve seat 37 and flow of liquid between inlet 33 and outlet 34 around reduced neck portion 41 of the valve assembly is permitted.

The clip 43 is provided with spring fingers 46 corresponding to the spring fingers 27 of the embodiment of Figs. 1 to 3. Similarly, the projecting portion of body 32 surrounding piston stem 38 is formed with sloping surfaces 47 and 48 having the same function in connection with spring fingers 46 as do the slopes 28 and 29 have in connection with the fingers 27 of the previous embodiment. The valve 42, accordingly, is moved to open and closed positions in body 32 by axial pushing and pulling motions imparted to the piston stem 38. The valve is normally held in closed position by virtue of spring 45 and is yieldingly held in open or closed positions by reason of the detents afforded by slopes 47 and 48 and spring fingers 46.

Valves embodying the present invention, whether of the drain, or cut-off type, provide simple, efficient means for controlling the flow of fluid therethrough. The valve member is resiliently held in either the open or closed position, and may be moved to either position simply by the application of a direct axial force to the valve stem.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. A fluid control valve, including a body, a longitudinal bore in said body, a valve seat formed in the wall of said bore, a valve engageable with said seat, a stem on said valve mounted in said bore for axial movement and projecting outside said bore, a clip mounted on the outer end of said stem, a counterbore in said body in surrounding relation to said stem adjacent its outer end, a compression spring arranged in said counterbore to press against said clip to thereby urge said stem in a direction to seat said valve, said stem being movable inwardly of said bore against the yielding resistance of said spring to unseat said valve, spring fingers on said clip in sliding resilient contact with the exterior of said body, and detent means on said body cooperable with said spring fingers to yieldingly hold said stem in selected positions of axial adjustment, said detent means comprising opposed sloping surfaces separated by a circumferential ridge, the sloping surface inwardly of said ridge being more steeply inclined than the sloping surface outwardly of said ridge.

2. A fluid control valve according to claim 1, characterized by fluid inlet and outlet ports in said body, a wall in said body separating said parts and said bore opening through said wall and interconnecting said ports.

3. A fluid control valve according to claim 1, characterized in that said stem is hollow and open at the said outer end thereof, said stem further having at least one radial port located outwardly of the valve seat in the seated position of the valve and projected relatively to the valve seat in the unseated position of the valve to establish communication between the opposite sides of the valve seat.

References Cited in the file of this patent

UNITED STATES PATENTS

| Number | Name | Date |
|---|---|---|
| 294,674 | Richter | Mar. 4, 1884 |
| 341,730 | Carver | May 11, 1886 |
| 583,807 | Kerns | June 1, 1897 |
| 974,580 | Lockwood | Nov. 1, 1910 |
| 1,017,756 | Head | Feb. 20, 1912 |
| 1,365,476 | Fuller | Jan. 11, 1921 |
| 1,766,262 | Simmons | June 24, 1930 |
| 2,095,696 | Hackel | Oct. 12, 1937 |
| 2,179,460 | White | Nov. 7, 1939 |
| 2,222,346 | Eickstaedt | Nov. 19, 1940 |
| 2,310,599 | Roach | Feb. 9, 1943 |
| 2,408,541 | Wilson | Oct. 1, 1946 |
| 2,506,722 | Kuehn et al. | May 9, 1950 |

FOREIGN PATENTS

| Number | Country | Date |
|---|---|---|
| 265,741 | Great Britain | Feb. 17, 1927 |
| 720,337 | France | Dec. 3, 1931 |